US012590684B2

(12) United States Patent (10) Patent No.: US 12,590,684 B2

Williamson (45) Date of Patent: Mar. 31, 2026

(54) LIGHT GUIDE WITH SINGLE OPTICAL CAVITY

(71) Applicant: Magna Exteriors Inc., Aurora (CA)

(72) Inventor: Chris Williamson, Macomb, MI (US)

(73) Assignee: Magna Exteriors Inc., Aurora (CA)

( * ) Notice: Subject to any disclaimer, the term of this patent is extended or adjusted under 35 U.S.C. 154(b) by 0 days.

(21) Appl. No.: 18/785,891

(22) Filed: Jul. 26, 2024

(65) Prior Publication Data

US 2024/0384849 A1 Nov. 21, 2024

Related U.S. Application Data

(63) Continuation of application No. PCT/US2023/061423, filed on Jan. 27, 2023.

(Continued)

(51) Int. Cl.
| | |
|---|---|
| *F21S 41/24* | (2018.01) |
| *B60Q 1/00* | (2006.01) |
| *F21S 41/141* | (2018.01) |
| *F21S 43/241* | (2018.01) |
| *F21S 43/243* | (2018.01) |
| *F21S 43/249* | (2018.01) |

(Continued)

(52) U.S. Cl.
CPC ............ *F21S 41/24* (2018.01); *B60Q 1/0052* (2013.01); *F21S 41/141* (2018.01); *F21S 43/241* (2018.01); *F21S 43/243* (2018.01); *F21S 43/249* (2018.01); *F21S 43/31* (2018.01); *F21S 43/33* (2018.01)

(58) Field of Classification Search
CPC ........ F21S 41/24; F21S 43/241; F21S 43/243;

F21S 43/249; F21S 43/31; F21S 43/33; F21S 41/141; F21S 43/235; B60Q 1/0052; F21V 7/0091; F21V 7/22; F21V 7/24; F21V 7/28; G02B 6/0096

See application file for complete search history.

(56) References Cited

U.S. PATENT DOCUMENTS

| | | | | |
|---|---|---|---|---|
| 5,555,161 A | * | 9/1996 | Roe ........................ | G02B 6/262 |
| | | | | 362/555 |
| 6,641,295 B1 | * | 11/2003 | Hu .......................... | F21S 41/24 |
| | | | | 362/540 |

(Continued)

FOREIGN PATENT DOCUMENTS

| | | | | |
|---|---|---|---|---|
| CN | 108302494 A | 7/2018 | | |
| DE | 19804723 A1 | * | 8/1998 | ............... F21V 7/24 |

(Continued)

OTHER PUBLICATIONS

International Search Report for PCT/US2023/061423 dated Apr. 21, 2023, 2-pages.

*Primary Examiner* — Erin Kryukova

(57) ABSTRACT

A lighting device including predetermined harmonious lighting zones with independence utilizing a single cavity. The lighting device provides predetermined selectively independent lighting zones that can have harmonious appearance when turned all on but maintain crisp zone definition when turned on independently. These lighting zones are generated by a single optical cavity. Hexagonal or other predetermined shaped one-piece or multi-piece lens includes inside plating to provide inner and outer light separation. There is provided isolation of light guides by use of plating in a one piece design or multipiece design.

20 Claims, 2 Drawing Sheets

Related U.S. Application Data

(60) Provisional application No. 63/304,294, filed on Jan. 28, 2022.

(51) Int. Cl.
    *F21S 43/31*       (2018.01)
    *F21S 43/33*       (2018.01)

(56)           References Cited

U.S. PATENT DOCUMENTS

| | | | | |
|---|---|---|---|---|
| 6,789,929 | B1 * | 9/2004 | Doong | F21V 7/0091 |
| | | | | 362/543 |
| 9,062,845 | B1 * | 6/2015 | Tsai | B60Q 1/0052 |
| 11,173,829 | B1 * | 11/2021 | Boecker | B60Q 1/28 |
| 2006/0062012 | A1 * | 3/2006 | Tsai | B60Q 1/0052 |
| | | | | 362/520 |
| 2006/0067086 | A1 * | 3/2006 | Hsu | B60Q 1/0052 |
| | | | | 362/544 |
| 2015/0062945 | A1 * | 3/2015 | Chen | F21S 43/249 |
| | | | | 362/516 |
| 2021/0372584 | A1 * | 12/2021 | Tai | F21S 41/143 |

FOREIGN PATENT DOCUMENTS

| | | | | | |
|---|---|---|---|---|---|
| DE | 20214177 | U1 | | 2/2003 | |
| DE | 102011104055 | A1 | | 12/2012 | |
| DE | 102012103309 | A1 | * | 10/2013 | F21S 43/14 |
| DE | 102014211963 | A1 | * | 12/2015 | B60Q 1/0041 |
| GB | 2418480 | A | * | 3/2006 | B60Q 1/0052 |
| JP | 2011175824 | A | | 9/2011 | |
| JP | 2015076310 | A | | 4/2015 | |
| JP | 2016009648 | A | | 1/2016 | |

* cited by examiner

LIGHT GUIDE WITH SINGLE OPTICAL CAVITY

CROSS-REFERENCE TO RELATED APPLICATIONS

This application is a Continuation of PCT International Patent Application No. PCT/US2023/061423, filed Jan. 27, 2023 and claims the benefit of U.S. Provisional Patent Application No. 63/304,294, filed Jan. 28, 2022. The disclosures of the above applications are incorporated herein by reference.

FIELD OF THE INVENTION

The present invention relates to lighting including optical zones utilizing a single cavity such as a hex lit liftgate light.

BACKGROUND OF THE INVENTION

Exterior rear vehicle lighting is well known for signaling, safety, and aesthetics. There is desired an optical design with lighting zones.

The present invention generates independent lighting zones that have a harmonious appearance when all turned on but maintain crisp zone definition when turned on independently. These lighting zones are operably generated by a single optical cavity.

SUMMARY OF THE INVENTION

The present invention is directed to providing harmonious lighting zones with independence utilizing a single cavity. According to aspects of the present invention, there is provided a hexagonal 1-piece lens with inside plating to provide predetermined inner and outer light separation as desired. One focus of the invention is to include isolation of light guides by use of plating in a one-piece design, which may be, but is not limited to, a generally hexagonal shape. The present invention is also adaptable and provides for a multi-piece design depending on the particular applications. According to various aspects, the present invention is related to predetermined optical designs separating a lit cavity into at least two separate zones and is operably adapted for connecting to vehicles, e.g., to rear body part, bumper, tailgate, liftgate, tail light panel, spoiler, trunk, light bar panel, rocker panel, roof, hood, wheel quarter panel, fender, lamp, and any other vehicle area/part and combinations thereof.

One goal in this invention is to generate independent lighting zones that can selectively have harmonious appearance when all turned on, but maintain crisp zone definition when turned on independently. These lighting zones are operably generated by a single optical cavity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
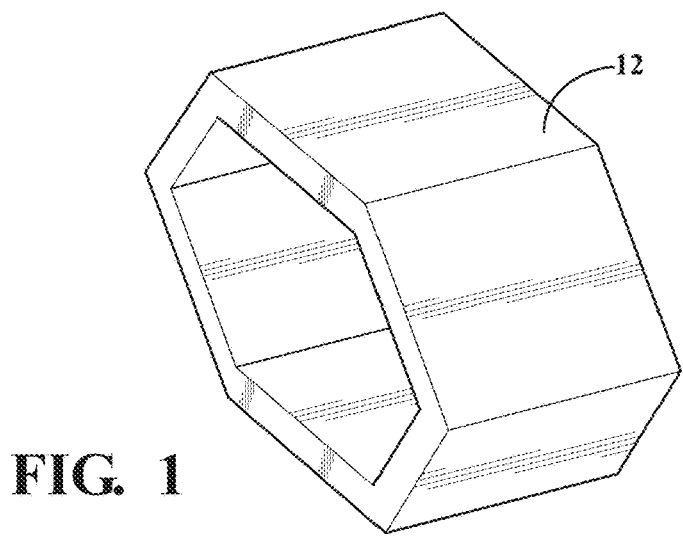
FIG. 1 is a perspective view of an exemplary housing guide of a lamp device, in accordance with the present invention.

The following description of the preferred embodiment(s) is merely exemplary in nature and is in no way intended to limit the invention, its application, or uses.

Referring to FIGS. 1-6 generally, there is provided a lamp device assembly shown generally at 10 operable to selectively generate predetermined plurality of independent lighting zones (e.g., and a plurality of predetermined combinations of lighting) that can have a predetermined harmonious appearance when turned on together (e.g., at least one light emitting diode, more preferably, a plurality of LEDs turned on), but maintains crisp zone definition when turned on independently (e.g., on/off central lighting, on/off ring lighting, on/off predetermined directed lighting, on/off additional or alternative suitable lighting, and any combinations). These lighting zones are preferably operably generated by a single optical cavity.

The present invention utilizes a single cavity molded part 10 to operably distribute light into a plurality of zones which offer up harmonious appearance at the surface when: (a) Any single zone is operably illuminated, such as the outer ring 12 or "housing" or "light guide" or "blade"; or, (b) All zones are operably illuminated at the same time, such as at least the outer ring 12 and central zone indicated generally at 24.

This is executed by using a single molded component that allows optical enhancement of light for an outer zone via a light guide, while using the inner cavity to reflect the light to the surface in a controlled manner to distribute the light evenly.

By way of example, using a single molded component (e.g., lamp device 10) that allows optical enhancement of light for an outer zone via light guide 12, while using an inner cavity portion 22 to reflect the light to at least one surface, e.g., outer surface 16, in a controlled manner to distribute the light evenly.

Figure 2:
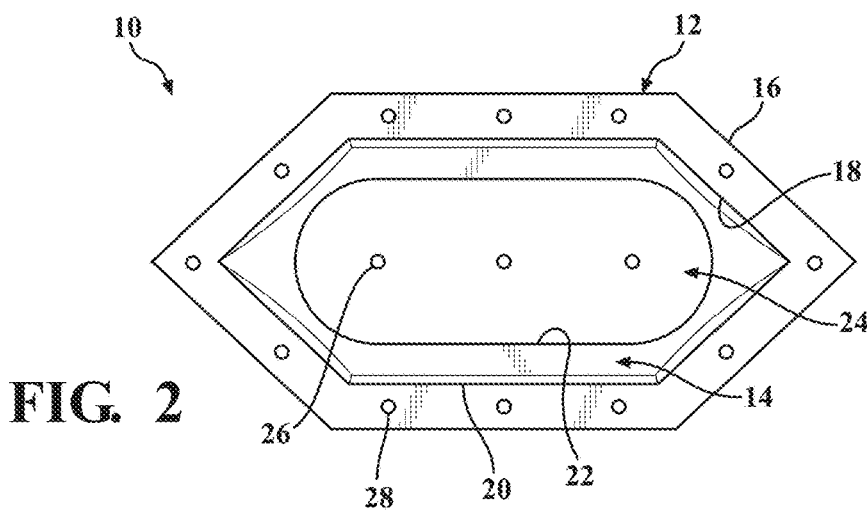
FIG. 2 is a front elevation view of a lamp device, in accordance with the present invention.
Figure 3:
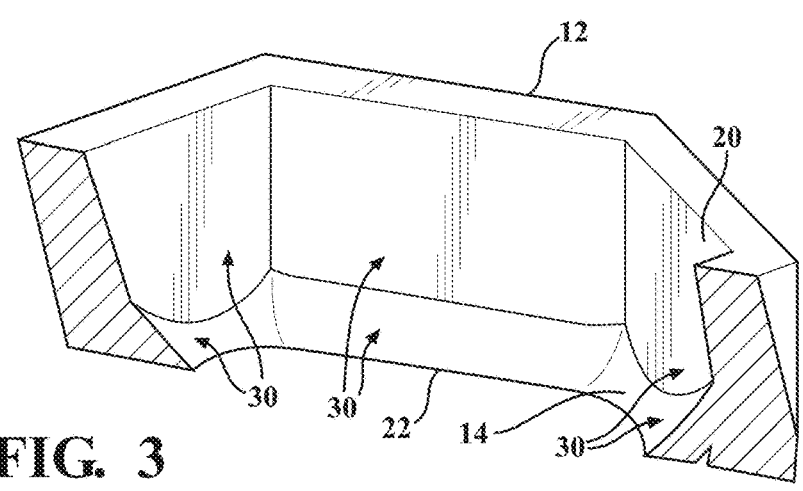
FIG. 3 is a perspective view of an exemplary housing of the lamp device, in accordance with the present invention.

Referring more particularly to FIGS. 2-3 there is depicted an exemplary lamp device 10 including at least one light blade 12 and at least one coated portion 14 (e.g., aluminum coating, reflective coating, metal, painted, reflective coating, etc., most preferably aluminum) that preferably has a predetermined contour. Preferably, this is a single cavity molded part (e.g., the light blade 12 and coated portion 14 are first integrally molded). The light blade 12 (or "guide") is preferably a clear housing, such as of a clear polycarbonate material. The light blade 12 has an outer surface 16 and inner surface portion 18 forming a generally hexagonal shaped light guide 12. However, it is understood that the present invention is adaptable for any alternative shapes and configurations contemplated depending on the application without departure from the scope of the present invention, e.g., generally oval, circular, rectangular, and any other suitable shape depending on the particular application.

The inner portion 18 and/or the coated portion 14 includes a plurality of reflective surfaces, most preferably, metallic surfaces, indicated generally at 30 in FIG. 3. According to aspects of the present invention, at least some of the reflective surfaces 30 are preferably at a plurality of predetermined angles from vertical to the light guide 12 body (e.g., see FIGS. 2-3). Preferably, reflective surfaces 30 are generally located in the areas spanning from a central surface 22 of the coated area 14 and includes the plurality of central surfaces 20 adjacent the clear light blade 12. In this way, the reflective surfaces 30 coat the central cavity of the light blade 12. Preferably, at least one pair of opposed inner longitudinal sides 20 extend substantially linearly, while having a different predetermined profile along a plurality of inner sides, e.g., curved, angled a predetermined amount from the hexagonal light guide 12 outer shape, etc. In accordance with aspects of the present invention, the present invention utilizes a single molded component 10 that allows optical enhancement of light for an outer zone via light guide 12, while using the inner cavity 14/20/30 to reflect the light to at least one predetermined surface in a controlled manner distributes the light evenly.

At least one light source is provided, e.g., light emitting diode (LED). Preferably, a plurality of LEDs are provided at predetermined locations in lamp device 10. By way of non-limiting example, at least one LED 26 operably mountable in a central portion indicated generally at 24. By way of non-limiting example, a plurality of LEDs 28 in the light blade 12. Or any combination of light guide 12 and central portion 24 light sources.

According to aspects of the present invention, at least one integral reflective surface 30 allows zoned lighting separation. Preferably, a coated inward disposed surface that is continuous without a gap or space in reflective surface coating. It is understood that alternatively, the coated reflective surfaces may be molded or otherwise formed with predetermined material(s) incorporating operable reflective properties.

Figure 4:
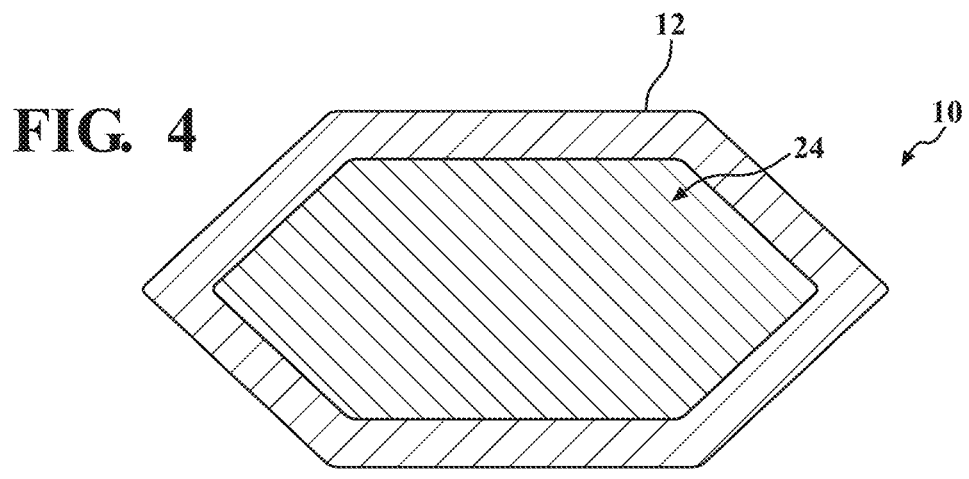
FIG. 4 is a front elevation view of the lamp device with an exemplary center and an exemplary ring illuminated, in accordance with the present invention.
Figure 5:
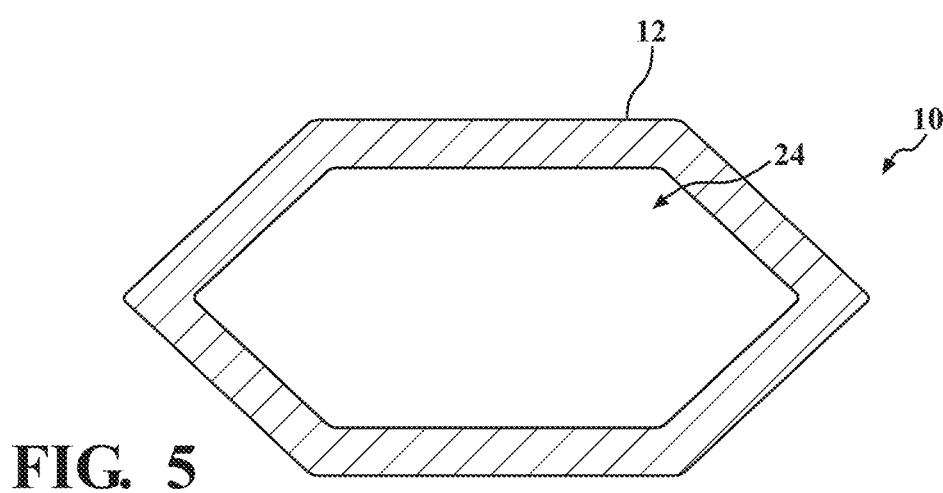
FIG. 5 is a front elevation view of the lamp device with an exemplary ring illuminated, in accordance with the present invention.
Figure 6:
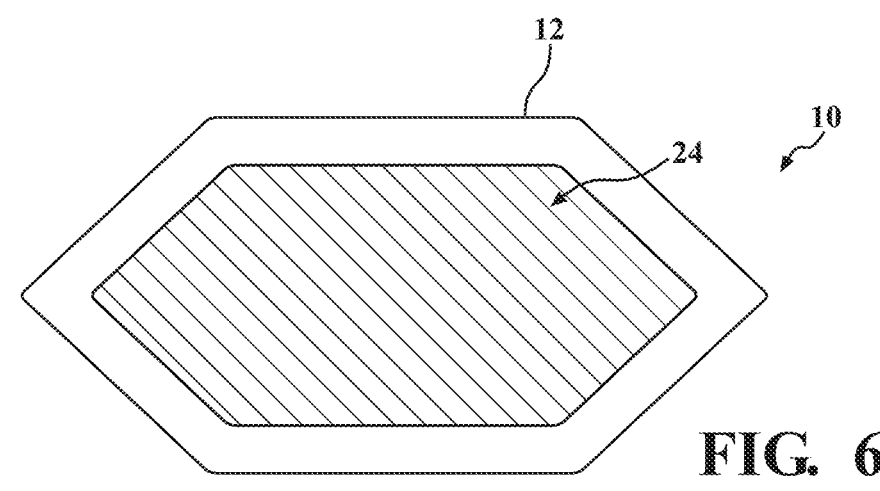
FIG. 6 is a front elevation view of the lamp device with an exemplary center illuminated, in accordance with the present invention.

FIGS. 4-6 illustrate exemplary lamp 10 lighting. FIG. 4 depicts the center 24 and ring 12 (guide) illuminated by at least one light source, e.g., LED. FIG. 5 depicts the ring 12 substantially illuminated by at least one light source, e.g., LED. FIG. 6 depicts only the center 24 substantially illuminated by at least one light source, e.g., LED.

According to aspects of the present invention, the light device assembly 10 is turned off/on under at least one of a predetermined condition, e.g., vehicle braking, key fob vicinity, motion or other sensor detected, night lighting, ambient lighting, ride share indication, turn signaling, autonomous signal, or any other suitable predetermined condition, and any combinations thereof.

According to aspects of the present invention the light device assembly 10 is in predetermined operable communication with the vehicle, e.g., wirelessly or hard wired.

It is understood that while a hexagon is illustrated, any predetermined shape is contemplated without departing from the scope of the present invention.

The light device 10 or lamp assembly is operably adapted to connect to any predetermined part, such as but not limited to, a liftgate of a motor vehicle. In accordance with aspects of the present invention, at least one lamp device 10 is operably adapted to connect to or be operably integrated into an appliance, electric compliance, automotive component, mobile device, computing device, windowpane, automotive glass, rear window, windshield, touch screen display, heads-up touchscreen display, instrument panel, instrument cluster, bezel, and any combinations thereof.

At least one light device 10 or lamp assembly is operably adapted to connect to any predetermined vehicle part for at least one predetermined function, e.g., such as but not limited to brake lighting, caution lighting, headlamp, predetermined vehicle and/or ground illumination under predetermined conditions, integrated messaging, etc.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A lamp device adapted for a vehicle, comprising:
a plurality of light sources;
a molded component that operably provides optical enhancement of light including an inner cavity that includes an inner surface defined by both a coated portion and multiple inner sides, wherein the coated portion has a contoured shape and extends from a longitudinal end of the molded component to multiple inner sides that extend longitudinally from the coated portion to a front end of the molded component, the inner sides are flat and not parallel to the coated portion, the coated portion and the inner sides are reflective surfaces operable to reflect light from a selected one or more of the plurality of light sources into the inner cavity to distribute light throughout the inner cavity, said molded component including an outer peripheral light guide extending from the inner surface to an outer surface and arranged directly overlaying other selected one or more of the plurality of light sources, the light guide being operable to direct light from said other plurality of light sources in an outer zone defined between the inner surface and the outer surface, wherein said molded component provides inner and outer zone separation, wherein said separation includes generating independent lighting zones comprising at least an inner zone in the inner cavity and said outer zone that allow substantially harmonious appearance with light across the entire front end when turned on together but appear as distinct zones when turned on independently.

2. The lamp device of claim 1, wherein said coated portion is curved and extends circumferentially continuously.

3. The lamp device of claim 1, wherein said light guide is formed of a clear material.

4. The lamp device of claim 1, wherein the light guide is a clear polycarbonate material.

5. The lamp device of claim 4, wherein the molded component is a 1-piece hexagonal body and the inner surface includes reflective plating to provide inner and outer light separation.

6. The lamp device of claim 1, wherein the coated portion and the inner sides are continuous without a gap or space in or between them and comprise a continuously coated central surface having at least one predetermined profile operable to direct light in at least one predetermined direction.

7. The lamp device of claim 1, wherein the inner sides include at least one pair of opposing longitudinal reflective surfaces and a plurality of adjacent integral reflective surfaces having at least one other predetermined profile.

8. The lamp device of claim 1, wherein said at least one light source comprises at least one light emitting diode operably mounted at a central portion of said light guide, and at least one light emitting diode operably mounted in said light guide.

9. A lamp device adapted for a vehicle, comprising:

a plurality of light sources;

a single cavity molded part with an outer surface and an inner surface defining a single optic cavity having a front end, said inner surface being defined by a contoured portion and a plurality of flat inner sides that are joined to the contoured portion and extend longitudinally away from the contoured portion, the contoured portion and the inner sides each constructed to reflect light into the single optic cavity so that light is reflected within the single optic cavity at multiple angles;

wherein one or more of said plurality of light sources are operably mounted in an inner zone including the single optic cavity and defined by the inner surface, and one or more other of said plurality of light sources are operably mounted in an outer zone defined between the outer surface and the inner surface and directly overlying the other of said plurality of light sources.

10. The lamp device of claim 9, wherein the coated portion and the inner sides are continuous without a gap or space in or between them and further comprise a continuous central reflective surface along the longitudinal length of the single cavity molded part.

11. A lamp device for a vehicle, comprising:

a light guide body formed of a clear material and having an inner surface and an outer surface, the inner surface is defined by a portion having a contoured shape and extending, from one longitudinal end of the body, both radially outwardly and longitudinally to multiple inner sides that are arranged at different angles, connected together, flat and extend longitudinally from a coated portion to a front end of the body that is opposite to said one longitudinal end, wherein the portion and the inner sides are reflective surfaces and are continuous without a gap or space in the reflective surfaces and define a single cavity within the body that extends to the front end;

at least one first light source arranged to emit light into the single cavity; and at least one second light source arranged to emit light into the body between the inner surface and the outer surface, wherein light emitted from the at least one first light source is reflected by the reflective surfaces within the single cavity within an inner zone defined by the single cavity, and light emitted from the at least one second light source is emitted from the body between the inner surface and the outer surface within an outer zone, and wherein in a first mode the inner zone is illuminated separate from the outer zone with the reflective surfaces maintaining definition of the inner zone separate from the outer zone, in a second mode the outer zone is illuminated separately from the inner zone with the reflective surfaces maintaining definition of the outer zone separate from the inner zone, and in a third mode both the outer zone and the inner zone are illuminated together providing light emission across all of the front end from both the inner zone and the outer zone.

12. The device of claim 11 wherein the inner surface is circumferentially continuous.

13. The device of claim 12 wherein the inner surface is circumferentially continuous along the entire circumferential length of the body between said one longitudinal end and the front end.

14. The device of claim 11 wherein the outer surface is parallel to the inner surface along the longitudinal extent of the inner sides.

15. The device of claim 11 wherein the outer surface of the body is defined by the clear material of the body.

16. The device of claim 11 wherein the portion having the contoured shape is defined by surfaces that are curved.

17. The device of claim 11 wherein multiple second light sources are provided evenly spaced apart within the body.

18. The device of claim 17 wherein multiple first light sources are provided.

19. The device of claim 11 wherein, in the third mode, light is emitted from the front end without the appearance that there are two distinct zones.

20. The device of claim 11 wherein, in the third mode, light is provided across the entire front face.

\*    \*    \*    \*    \*